US012566160B2

(12) United States Patent
Op De Beeck et al.

(10) Patent No.: US 12,566,160 B2
(45) Date of Patent: Mar. 3, 2026

(54) PILLAR STRUCTURES

(71) Applicant: PHARMAFLUIDICS, Ghent (BE)

(72) Inventors: Jeff Op De Beeck, Mariakerke (BE);
Bo Claerebout, Kortrijk (BE); Paul Jacobs, Lokeren (BE)

(73) Assignee: PharmaFluidics NV, Ghent (BE)

( * ) Notice: Subject to any disclaimer, the term of this patent is extended or adjusted under 35 U.S.C. 154(b) by 358 days.

(21) Appl. No.: 18/254,054

(22) PCT Filed: Dec. 29, 2021

(86) PCT No.: PCT/IB2021/062409
§ 371 (c)(1),
(2) Date: May 23, 2023

(87) PCT Pub. No.: WO2022/144786
PCT Pub. Date: Jul. 7, 2022

(65) Prior Publication Data
US 2024/0003856 A1      Jan. 4, 2024

(30) Foreign Application Priority Data
Dec. 30, 2020    (BE) ................................... 2020/6008

(51) Int. Cl.
*G01N 30/60* (2006.01)
(52) U.S. Cl.
CPC ................................. *G01N 30/6095* (2013.01)
(58) Field of Classification Search
None
See application file for complete search history.

(56) References Cited

U.S. PATENT DOCUMENTS

| | | | |
|---|---|---|---|
| 8,652,420 | B2 | 2/2014 | Desmet |
| 11,207,682 | B2 | 12/2021 | Desmet et al. |
| 2011/0108522 | A1* | 5/2011 | Rozing .............. G01N 30/6095 |
| | | | 264/293 |
| 2019/0210019 | A1* | 7/2019 | Kung ...................... G01N 1/40 |

FOREIGN PATENT DOCUMENTS

| | | |
|---|---|---|
| EP | 2541245 A1 | 1/2013 |
| EP | 2953716 B1 | 5/2017 |
| WO | WO-9854568 A1 | 12/1998 |
| WO | WO-2006097302 A1 | 9/2006 |

OTHER PUBLICATIONS

Ikonen, et. al., Electrochemically anodized porous silicon: Towards simple and affordable anode material for Li-ion batteries, Scientific Reports | 7: 7880 | DOI:10.1038/s41598-017-08285-3. (Year: 2017).*
De Malsche W., et al., "Integration of Porous Layers in Ordered Pillar Arrays for Liquid Chromatography," Lab on a Chip, Royal Society of Chemistry, Sep. 21, 2007, vol. 7, No. 12, XP002512681, pp. 1705-1711.
PCT/IB2021/062409, International Search Report and Written Opinion, Mar. 22, 2022, 13 pages.

* cited by examiner

*Primary Examiner* — Krishnan S Menon

(57) ABSTRACT
A chemical reactor implemented on a substrate is described. The chemical reactor includes at least one channel for transporting a liquid and/or gas during operation of the chemical reactor. The channel comprises pillar structures perpendicular to the bottom of the channel having a transverse section parallel to the bottom that is substantially rectangular and wherein the pillar structures are provided with a porous layer of substantially homogeneous thickness applied via electrochemical anodising.

15 Claims, 2 Drawing Sheets

200 obtaining a substrate with a fluid channel in which an
ordered set of silicon pillar structures is positioned obtaining a silicon substrate with a silicon nitride top
layer — 212 applying a resist layer and creating a pattern using
lithography — 214 carrying out a first reactive ion etching — 216 carrying out a second lithographic step using a
second resist layer — 218 etching using Bosch process — 220 removing the resist — 222

210 creating pillars using the Bosch — 224

230

Electromechanical anodization of at least the silicon pillar structures

240
+
250

Thermal treatment and functionalisation of the substrate and the
pillar structures

260

Closing the channel

[Fig. 3]

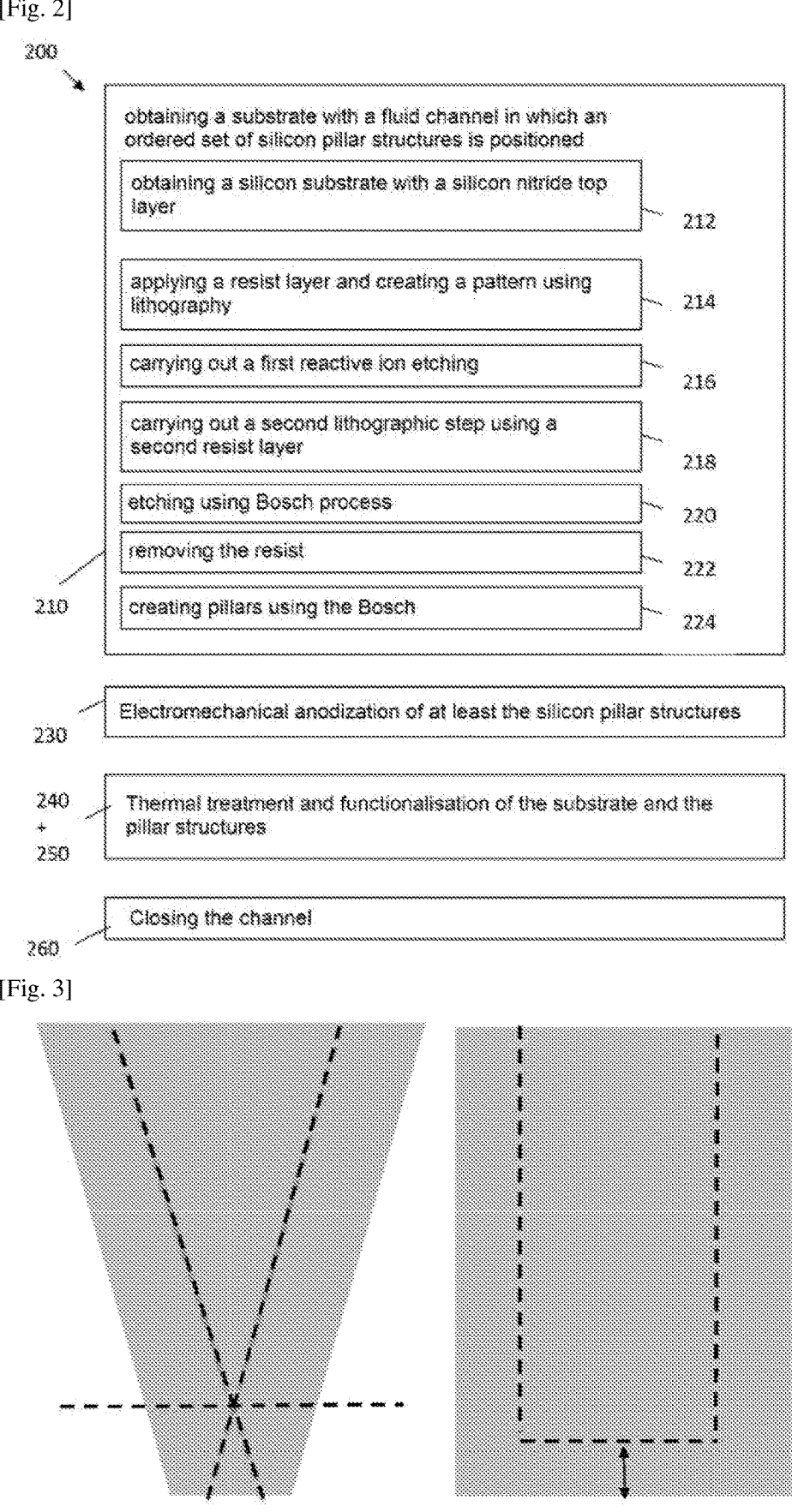

PILLAR STRUCTURES

CROSS-REFERENCE TO RELATED APPLICATIONS

This application is a 371 of International application no. PCT/IB2021/062409 filed Dec. 29, 2021, which claims priority to BE application no. BE2020/6008 filed Dec. 30, 2020, which disclosures are herein incorporated by reference in their entirety.

TECHNICAL FIELD OF THE INVENTION

The present invention relates generally to chemical reactors such as chromatographic systems. More specifically, the present invention relates to chemical reactors provided with pillar structures for example for chromatographic applications.

BACKGROUND OF THE INVENTION

Systems using liquid propagation have a wide range of applications, including production of chemical components, synthesis of nanoparticles, separation and/or extraction of components, etc. A specific example of a separation technique for separating mixtures, in order to be able to analyse them accurately for example, is chromatography. There is a variation of forms of chromatography such as gas chromatography, gel chromatography, thin-layer chromatography, adsorption chromatography, affinity chromatography, liquid chromatography, etc. Liquid chromatography is typically used in pharmacy and chemistry, both for analytical and production applications. Liquid chromatography exploits the difference in solubility of different substances with a mobile phase and a stationary phase. Since each substance has its own "adhesion force" to the stationary phase, they are carried along with the mobile phase faster or slower, and in this way certain substances can be separated from others. It is in principle applicable to any compound, it has the advantage that no evaporation of the material is required and that variations in temperature have only a negligible effect.

In order to increase the interaction, pillar structures are often used in chromatographic structures in the channel where the separation has to take place. Furthermore, it is known that the porosity of the channels has a clear effect on the performance for chromatographic applications, e.g. liquid chromatography applications. This was for instance described by De Pra et al. in "Pillar-structured microchannels for on-chip liquid chromatography: Evaluation of the permeability and separation performance" in J. Sep. Sci. 2007 (30) 1453-1460, where it was found that the permeability for flow through channels increased strongly with the general porosity of the channels.

It is therefore known to make the pillar structures that are provided in columns, for example, to better perform chromatography, porous. This drastically improves the amount of free surface area, while maintaining the ordered structure of the system. In "Fabrication and Chromatographic Performance of Porous-Shell Pillar-Array Columns" Anal. Chem. 2010 82 (17) 7208-7217, a fabrication technique is described by Detobel et al. for making pillar structures with a porous top layer for chip-based liquid chromatography.

However, in order to meet the high demands in chromatography applications, there is a need for column structures with optimal characteristics as well as for good production techniques to make these column structures.

One well-known form of column structures in state of the art technology are cylindrical columns. These have the advantage that they are relatively easy to make and, when provided with a porous layer, typically have a porous layer of homogeneous thickness over their mantle surface.

European Patent EP2953716 describes rhomboid pillar structures with a large width-to-length ratio. These result in special advantages with regard to edge effects. More specifically, such structures provide a better flow profile near the edges, so that the separation can proceed more evenly. In addition, the large width-to-length ratio results in an increased tortuosity, which also makes the separation more efficient.

However, there is still room for improvement.

SUMMARY OF THE INVENTION

It is an advantage of embodiments according to the present invention to provide chemical reactors and processes based on one or multiple channels with porous pillar structures having a high and uniform separation capacity.

It is an advantage of embodiments of the present invention to provide systems and methods having a high permeability for flow through the channel.

It is an advantage of embodiments of the present invention to provide systems and methods in which the liquid or gas flowing through the channel has a long effective flow path so that there can be a good interaction.

It is an advantage of some embodiments of the present invention that porous silicon-based micropillar structures may be used.

It is an advantage of embodiments of the present invention that efficient systems for separating materials can be produced.

It is thus an advantage of at least some embodiments of the present invention that the provided systems have a very good separation capability.

The above objective is achieved by an apparatus and a method in accordance with embodiments of the present invention.

The present invention relates to a chemical reactor implemented on a substrate, the chemical reactor comprising at least one channel for transporting a liquid and/or gas during operation of the chemical reactor, wherein the channel comprises pillar structures perpendicular to the bottom of the channel, wherein the pillar structures have a transverse section parallel to the bottom that is substantially rectangular, and wherein the pillar structures are provided with a porous layer of substantially homogeneous thickness applied via electrochemical anodizing.

In embodiments according to the present invention where reference is made to a substantially rectangular shape, reference is made to a shape whose sides are substantially two by two parallel and perpendicular to each other. The angles are preferably 90° or approximately 90°, for example between 80° and 100° or for example between 85° and 95°. In some embodiments, the corners may be rounded. Essential to the substantially rectangular shape is that the sides are substantially perpendicular to each other. This results in a porous layer thickness that indeed varies little to none on all sides. This is in contrast to diamond-shaped pillar structures, for example, where the growth rate of the layer thickness is always higher at the sharp angles than at the obtuse angles.

It is an advantage of embodiments of the present invention that embodiments are obtained in which the channel can have a small footprint while providing a long effective flow path for the liquid and/or gas flowing through the channel. It is an advantage of embodiments of the present invention that embodiments are obtained in which the active surface for interaction with the static phase is large while the footprint of the channel is small. In other words, the length of the channel can be kept shorter while still achieving a good interaction between the static phase and the mobile phase.

The pillar structures may be an ordered set of pillar structures, wherein the outer surface of the pillar structures is provided with a porous layer having a thickness that varies no more than 10%, preferably no more than 5%, along the perimeter and/or outer sheath of the pillar structures.

Wherever reference is made in the present invention to a substantially uniform thickness, the terminology growing a substantially conforming layer may also be used.

It is an advantage of embodiments of the present invention that the thickness of the interaction layer of the pillar structures for interaction between the mobile and static phase is substantially homogeneous. It is an advantage of embodiments of the present invention that the thickness of the interaction layer at the corners of the pillar structures is substantially the same as the thickness along the sides of the pillar structures. It is an advantage of embodiments of the present invention that the variation in the width of the path through which the liquid and/or gas flows is limited.

The pillar structures may be microfabricated pillar structures.

The pillar structures may be microfabricated silicon-based pillar structures.

The pillar structures have a width perpendicular to the average flow direction of the fluid and/or gas in the channel and have a length along the average flow direction of the fluid and/or gas in the channel, and the length may be greater than two times the thickness of the porous layer on the non-porous core of the pillar structures.

The length of the pillar structures may be at least three times the thickness of the porous layer on the non-porous core of the pillar structures.

The length may also be at least five times the thickness of the porous layer on the sheath of the pillar structures, for example at least seven times the thickness of the porous layer on the non-porous core of the pillar structures.

It is an advantage of embodiments of the present invention that the pillar structures exhibit good adhesion in the channel, so that they can withstand relatively high liquid and/or gas pressure.

The pillar structures have a width perpendicular to the average direction of flow of the liquid and/or gas in the channel and have a length along the average direction of flow of the liquid and/or gas in the channel, wherein the pillar structures in the channel may be oriented such that they have a greater width than length.

The width-to-length ratio may be greater than 2 to 1, for example greater than 5 to 1, for example greater than 7 to 1, for example greater than 12 to 1.

It is an advantage of some embodiments of the present invention that, in addition to providing a homogeneous porous layer and thus efficient separation, they also provide a structure that suffers little to no edge effects at the walls of the channel.

The porous layer may be formed, for example, by electrochemical anodizing.

The porous layer may be obtained, for example, by removing material on the basis of an electric current applied through the core of the pillars.

The porous layer may be formed, for example, by growing the layer conformably with the outer circumference of the pillars.

The porous layer may be formed, for example, by growing the layer at a fixed rate and/or a rate that is the same at all points on the surface of the pillars at any time.

The porous layer may be formed, for example, by electrochemically removing material based on an electric current applied through the core of the pillars, for example orthogonally to the outer sheath, to apply the porous layer from the outside to the inside in a uniform manner.

The chemical reactor may include a chromatographic column.

The chemical reactor may be a chromatography system.

The chromatography system may be a high-performance liquid chromatography system.

In a second aspect, the present invention also relates to a method for producing a chemical reactor implemented on a substrate. The method comprises providing a substrate with at least one channel for transporting a liquid and/or gas during operation of the chemical reactor, wherein the channel comprises pillar structures perpendicular to the bottom of the channel having a transverse cross-section parallel to the bottom that is substantially rectangular, and applying a porous layer of substantially homogeneous thickness to the pillar structures by electrochemical anodizing.

The method may include, for example, growing the porous layer by removing material based on an electric current applied through the core of the pillars.

The method may include, for example, growing the porous layer by growing the layer conformably to the outer circumference of the pillars.

The method may include, for example, growing the porous layer by growing the porous layer at a fixed rate.

Specific and preferred aspects of the invention are incorporated in the attached independent and dependent claims. Features of the dependent claims may be combined with features of the independent claims and with features of other dependent claims as appropriate and not only as expressly presented in the claims.

BRIEF DESCRIPTION OF THE DRAWINGS

FIG. 1 illustrates a portion of a chemical reactor having substantially rectangular pillar structures, in accordance with the present invention.

FIG. 2 illustrates an exemplary method for fabricating a channel with porous pillar structures.

FIG. 3 illustrates the formation of the porous layer for a diamond-shaped pillar structure and for a rectangular pillar structure, which illustrates the advantages of embodiments of the present invention.

The figures are only schematic and not limiting. In the figures, the dimensions of some parts may be exaggerated and not presented to scale for illustrative purposes. The dimensions and relative sizes do not necessarily correspond to those of practical embodiments of the invention. Reference numbers in the claims should not be interpreted to limit the scope of protection.

BEST MODE FOR CARRYING OUT THE INVENTION

The present invention will be described with reference to specific embodiments and to certain figures, but the invention is not limited by this and is limited only by the claims.

It should be noted that the terms "includes" and "comprises" as used in the claims are not to be interpreted as limited to the means described thereafter; this term does not exclude other elements or steps. Thus, it is to be interpreted as specifying the presence of the listed features, values, steps or components referred to, but does not exclude the presence or addition of one or more other features, values, steps or components, or groups thereof. Thus, the scope of the expression "a device containing resources A and B" should not be limited to device comprising only of components A and B. It means that with regard to the present invention, A and B are the only relevant components of the device.

Reference throughout this specification to "one embodiment" or "an embodiment" means that a specific feature, structure or characteristic described in connection with the embodiment is incorporated in at least one embodiment of the present invention. Thus, occurrence of the expressions "in one embodiment" or "in an embodiment" in various places throughout this specification do not necessarily all refer to the same embodiment, but may do so. Furthermore, the specific features, structures or characteristics may be combined in any suitable manner, as would be apparent to a person skilled in the art on the basis of the present disclosure, into one or more embodiments.

Similarly, it should be appreciated that in the description of exemplary embodiments of the invention, several features of the invention are sometimes grouped together in a single embodiment, figure or description thereof for the purpose of streamlining the disclosure and assisting in the understanding of one or more of the several inventive aspects. In any event, this method of disclosure should not be interpreted as reflecting an intention that the invention requires more features than are explicitly listed in each claim. Rather, as the following claims reflect, inventive aspects lie in less than all features of a single prior disclosed embodiment. Thus, the claims following the detailed description are hereby explicitly incorporated into this detailed description, with each stand-alone claim being a separate embodiment of this invention.

Furthermore, while some embodiments described herein include some, but not other, features included in other embodiments, combinations of features of different embodiments are intended to be within the scope of the invention, and constitute these different embodiments, as would be understood by the skilled person. For example, in the following claims any of the described embodiments may be used in any combination.

It should be noted that the use of certain terminology in describing certain features or aspects of the invention should not be construed to imply that the terminology is redefined herein to be limited to specific features of the features or aspects of the invention with which such terminology is coupled.

In a first aspect, the present invention concerns a chemical reactor implemented on a substrate. The chemical reactor is, for example, a system for separation of components in a liquid and/or a gas, as for example in chromatographic applications. The chemical reactor includes at least one channel for transporting a liquid and/or gas during operation of the chemical reactor, wherein the channel includes pillar structures perpendicular to the bottom of the channel. In accordance with embodiments of the present invention, the pillar structures have a transverse cross section parallel to the bottom that is substantially rectangular. The pillar structures are provided with a porous layer with a substantially homogeneous thickness applied via electrochemical anodizing.

It should be noted that, for example, for diamond-shaped or rhombic pillars, i.e. pillars that have a transverse cross section parallel to the base that is, for example, in the shape of a diamond or rhombus, due to their specific shape and electrochemical anodising, the pillars will have a porous layer that is intrinsically non-uniform, as the growth rate around sharp angles is typically higher. The absence of a porous layer with a substantially homogeneous thickness results in a negative effect for e.g. chromatographic applications.

Figure 1:
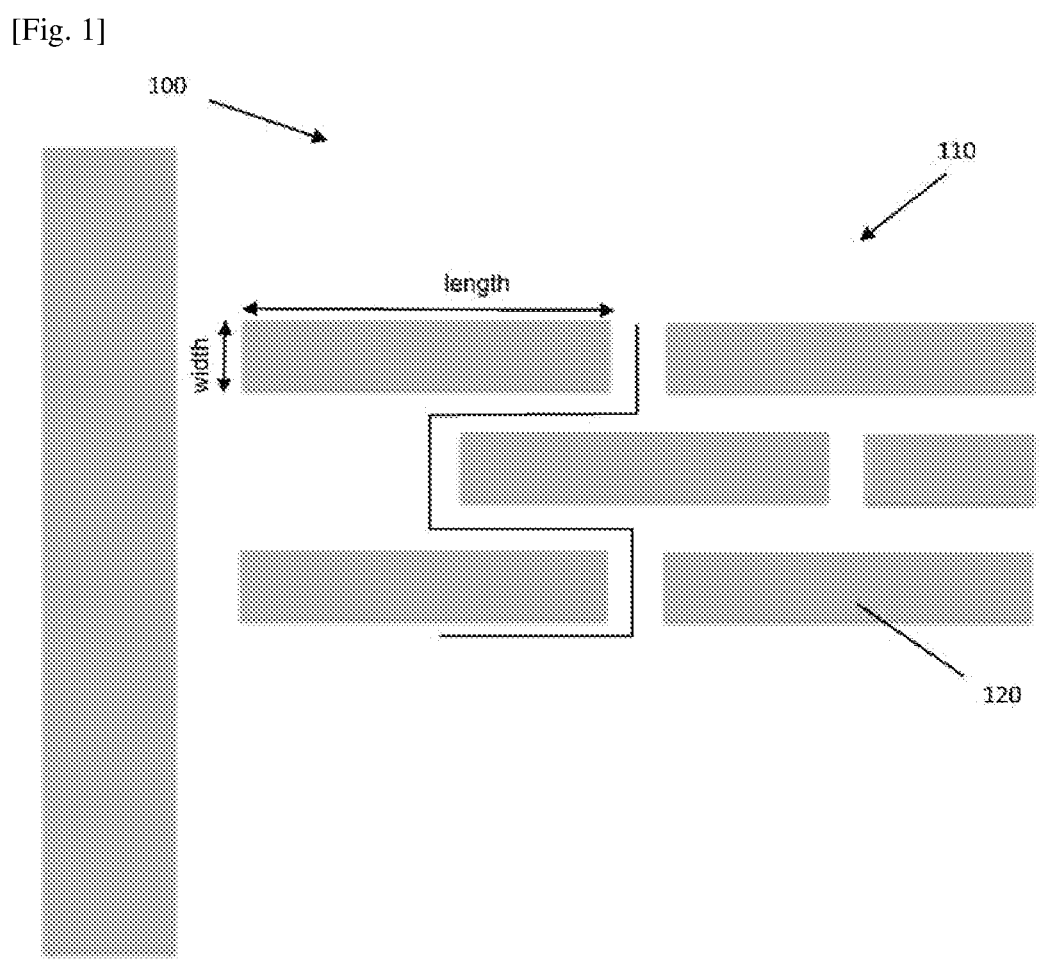

By way of illustration, [FIG. 1] shows a portion of a chemical reactor 100 in which a channel 110 is visible and in which pillar structures 120 are shown according to an exemplary embodiment of the present invention. In the present example, the chemical reactor 100 is based on a substrate in which one or more channels are provided. This substrate may be, for example, a silicon substrate or a silicon-based substrate, although embodiments are not limited by this and other substrates, for example other semiconductor substrates, may also be used. If multiple channels are used, they may be provided, for example, in a meandering configuration so that the total interaction time of the liquid and/or gas with the structure is extended, while the footprint of the chemical reactor remains limited. Other components of the chemical reactor 100 such as, for example, a distributor for accurately conveying the liquid and/or gas plug from a supply pipe to the channel or from the channel to a discharge pipe may of course also be provided, as will be understood by the skilled person.

The characteristics of the channels and any pillars may correspond to those known from the state of the art. For example, the channels may have a width between 50 μm and 250 mm, for example between 50 μm and 100 mm, for example between 50 μm and 50 mm, for example between 50 μm and 20 mm. The channels may have a depth between 2 μm and 1 mm, for example between 2 μm and 50% of the typical wafer thickness of a silicon wafer, for example between 2 μm and 90% of the typical wafer thickness of a silicon wafer. The pillars can have a typical size between 100 nm and 3 mm, for example between 100 nm and 100 μm.

An ordered set of pillar structures is preferably provided in channel 110. The pillar structures are typically positioned in a manner such that the position of the sub-channel between two pillar structures in the average flow direction from a row does not correspond to the position of a sub-channel between two pillar structures in a subsequent row. In this way, the tortuosity of the system increases and the length of the flow path of the liquid and/or gas flowing through the structure increases. Thus, it is ensured that the interaction in the separation channel is greater.

In accordance with embodiments of the present invention, the pillar structures may be provided on the outside with a porous layer having a thickness varying up to 10%, preferably up to 5% varying along the outer sheath of the pillar structures. These porous layers are, for example, porous layers formed from the sheath of the pillar structure inwards, for example, by electrochemical anodization. An advantage of such porous layers is that their formation does not change the outer dimension of the originally formed pillars. This has the advantage that the order and uniformity aimed for by the design is not or hardly affected by the application of the porous layers. It is an advantage that the flow width of the paths in the structure is substantially maintained when the porous layers are applied. It is an advantage of embodiments of the present invention that the variation on the thickness of the porous layer, i.e. the interaction layer, is limited. In other words, the pillar structures are characterised by a substantially homogeneous layer. This is caused by the specific shape of the pillar structures used in embodiments of the present invention, in combination with the production method used.

By way of illustration, embodiments are thereby not limited, an example method for making a chemical reactor device is illustrated with reference to [FIG. 2].

Method 200 includes, in a first step, obtaining 210 of a substrate comprising a fluid channel in which an ordered set of silicon pillar structures is positioned. This step 210 typically includes a plurality of sub-steps. By way of example, one possible set of substeps is illustrated here, although embodiments are not limited by this. Other sets of sub-steps, such as known to the person skilled in the art, which also result in a substrate having a fluid channel in which an ordered set of silicon pillar structures is positioned may also be used.

In a first sub-step 212 of an exemplary set of sub-steps, a substrate is obtained, in the present example a silicon substrate with a silicon nitride top layer having a thickness of 100 nm to 1 μm, as shown in [FIG. 2] part (a).

In a second sub-step 214, a resist layer is applied and a pattern is created using lithography, for example deep UV lithography, as shown in [FIG. 2] part (b).

In a third sub-step 216, a first reactive-ion etching is performed on the SiN layer, as illustrated in [FIG. 2] part (c).

In a fourth sub-step 218, using a second resist layer, a second lithographic step is performed, for example using mid UV lithography which results in μm accuracy, followed by a further reactive ion etching on the SiN layer, as illustrated in [FIG. 2] part (d).

In a fifth sub-step 220, some structures are further etched, for example by means of the Bosch process, although this does not limit the embodiments. This is illustrated in FIG. 2 part (e).

Thereafter, the resist is removed in a sixth sub-step 222 as shown in [FIG. 2] part (f) and pillars are created in a seventh sub-step 224 by means of the Bosch process, as shown in [FIG. 2] part (g). Although the Bosch process is not essential to the invention, it advantageously results in steep walls, which, for example, make a slope between 89° and 91° with respect to the plane of the substrate.

In a second step 230, the method 200 also comprises electrochemically anodizing at least the silicon pillar structures, as shown in [FIG. 2] part (h) to make the silicon pillar structures porous at least to a certain depth. The solution used to anodize may include, for example in some embodiments, an acid, for example HF. The solution may also contain water and a surface tension reducing component, such as ethanol or a surfactant.

By way of illustration, the creation of the porous layer for diamond-shaped pillar structures—in accordance with the state of the art—and the creation of the porous layer for substantially rectangular pillar structures are shown in [FIG. 3]. The technique for forming the porous layer for the diamond-shaped pillar structures results at the sharp ends in an inhomogeneity of the porous layer over the mantle surface. The latter is avoided by using substantially rectangular pillar structures.

The pillar structures according to embodiments of the present invention have a width perpendicular to the average flow direction of the liquid and/or gas in the channel and have a length along the average flow direction of the liquid and/or gas in the channel. They are further characterised by having a length greater than two times the thickness of the porous layer on the non-porous core of the pillar structures. In some embodiments, the length of the pillar structures is at least three times the thickness of the porous layer on the non-porous core of the pillar structures, for example, at least five times the thickness of the porous layer on the non-porous core of the pillar structures, for example, at least seven times the thickness of the porous layer on the non-porous core of the pillar structures. It is an advantage that the surface of the pillar structures that forms the bonding surface with the rest of the channel, i.e., the non-porous part of the mantle surface of the pillar structures (i.e., for example, at the top of the pillar structures), can be relatively large. Moreover, due to the specific shape of the pillar structures, this bonding surface does not have any sharp or narrow areas, which also improves the bonding.

In accordance with one embodiment of the present invention, the pillar structures are oriented such that they have a greater width than length.

For example, the width to length ratio may be greater than 2 to 1, for example greater than 5 to 1, for example greater than 7 to 1, for example greater than 12 to 1. This leads to the fact that in the channel, edge effects related to variations in flow velocity near the walls of the channel are reduced.

In accordance with embodiments of the present invention, the chemical reactor may include a chromatographic column or may be a chromatographic system. In some embodiments, this may even be a high-performance liquid chromatography system.

In a second aspect, the present invention also relates to a method for producing a chemical reactor implemented on a substrate. The method comprises providing a substrate with at least one channel for transporting a liquid and/or gas during operation of the chemical reactor, wherein the channel comprises pillar structures perpendicular to the bottom of the channel having a transverse cross section parallel to the bottom that is substantially rectangular and applying a porous layer having a substantially homogeneous thickness to the pillar structures by electrochemical anodizing. The method may further include steps as described, for example, in International Patent Application WO2019/043270.

The invention claimed is:

1. A chemical reactor implemented on a substrate, the chemical reactor comprising:
    at least one channel for transporting a fluid during operation of the chemical reactor
    wherein the channel includes an ordered set of pillar structures perpendicular to the bottom of the channel,
    wherein the pillar structures have;
        a transverse section parallel to the bottom that is substantially rectangular,
        a width perpendicular to an average flow direction of the fluid in the channel,
        a length along the average flow direction of the fluid in the channel, and
        a width-to-length ratio greater than 2 to 1, and
    wherein the pillar structures are provided with a porous layer of substantially homogeneous thickness applied via electrochemical anodizing, and
    wherein the pillar structures are positioned such that a position of a sub-channel between two pillar structures in the average flow direction from a row does not correspond to a position of a sub-channel between two pillar structures in a subsequent row.

2. A chemical reactor according to claim 1, wherein a thickness of the porous layer on an outside of the pillar structures varies no more than 10%, along the perimeter of the pillar structures.

3. A chemical reactor according to claim 1, wherein the pillar structures are microfabricated pillar structures.

4. A chemical reactor according to claim 1, wherein the pillar structures are microfabricated silicon-based pillar structures.

5. A chemical reactor according to claim 1, wherein the length is greater than two times the thickness of the porous layer on the non-porous core of the pillar structures.

6. A chemical reactor according to claim 5, wherein the length of the pillar structures is at least three times the thickness of the porous layer on the non-porous core of the pillar structures.

7. A chemical reactor according to claim 1, wherein the porous layer is formed by removing material on the basis of an electric current applied through the core of the pillars.

8. A chemical reactor according to claim 1, wherein the porous layer is formed by growing the porous layer conformably with an outer circumference of the pillars.

9. A chemical reactor according to claim 8, wherein the porous layer is grown at a fixed speed, a speed that is equal at all times at all points on the surface of the pillars, or a fixed speed that is equal at all times at all points on the surface of the pillars.

10. A chemical reactor according to claim 1, wherein the chemical reactor comprises a chromatographic column.

11. A chemical reactor according to claim 1, wherein the chemical reactor is a chromatography system.

12. A chemical reactor according to claim 11, wherein the chromatography system is a high-performance liquid chromatography system.

13. A method for producing a chemical reactor implemented on a substrate, the method comprising:

providing a substrate having at least one channel for transporting a fluid during operation of the chemical reactor, wherein the channel comprises pillar structures which are perpendicular to the bottom of the channel and which have a transverse section parallel to the bottom which is substantially rectangular, the pillar structures having a width perpendicular to an average flow direction of the fluid in the channel, a length along the average flow direction of the fluid in the channel, and a width-to-length ratio greater than 2 to 1, the pillar structures positioned such that a position of a sub-channel between two pillar structures in the average flow direction from a row does not correspond to a position of a sub-channel between two pillar structures in a subsequent row; and of generating a porous layer of substantially uniform thickness on the pillar structures by electrochemical anodizing.

14. The method of claim 13, wherein generating the porous layer by electrochemical anodizing includes removing material based on an electric current applied through a core of the pillar structures.

15. The method of claim 14, wherein the electric current is applied orthogonally to an outer sheath of the pillars.

* * * * *